Oct. 25, 1938.　　　　L. POUSSEL　　　　2,134,374
AUTOMATIC CUTTING MACHINE FOR BRICKS OR THE LIKE
Filed Aug. 31, 1937　　　3 Sheets-Sheet 1
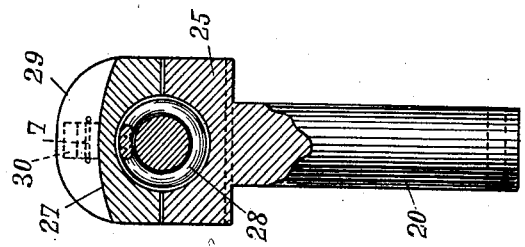
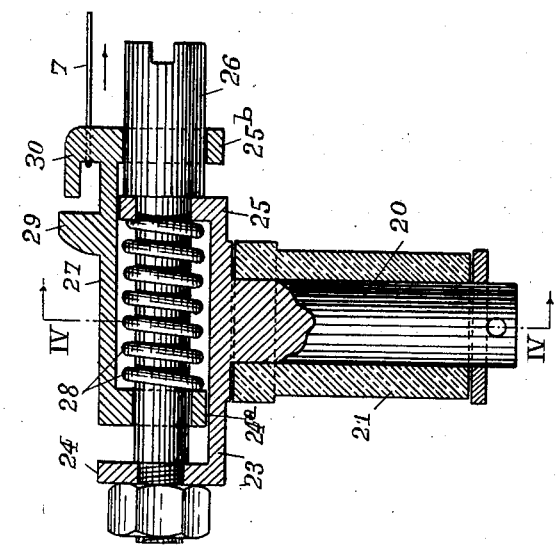
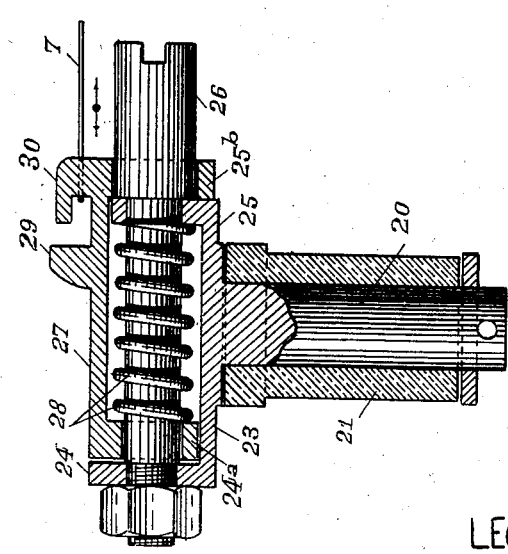
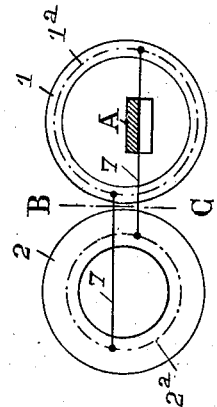
INVENTOR:
LEOPOLD POUSSEL
BY Haseltine, Lake & Co.
ATTORNEYS

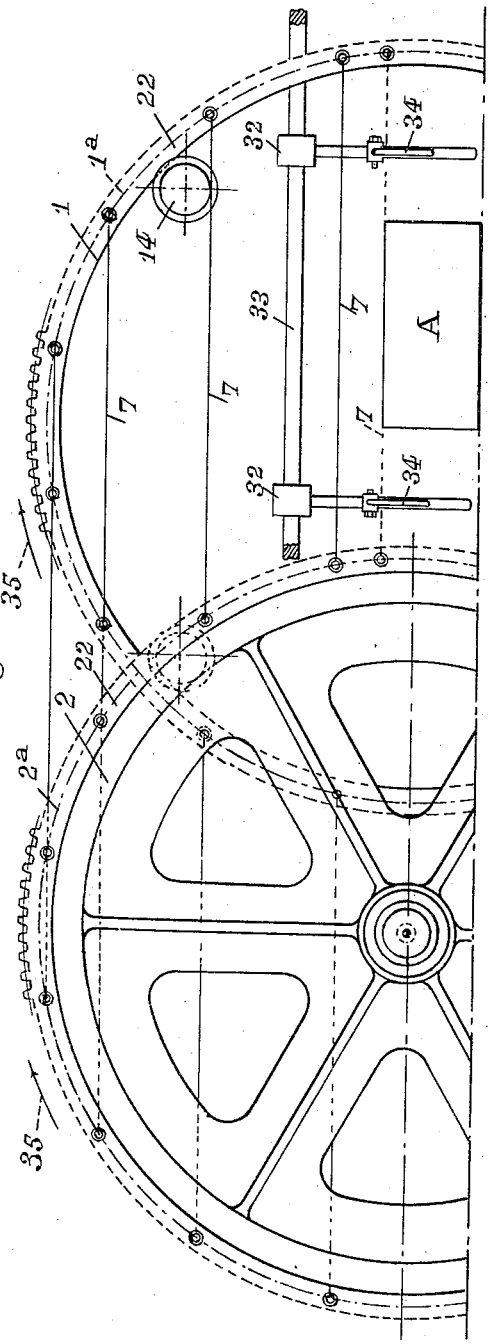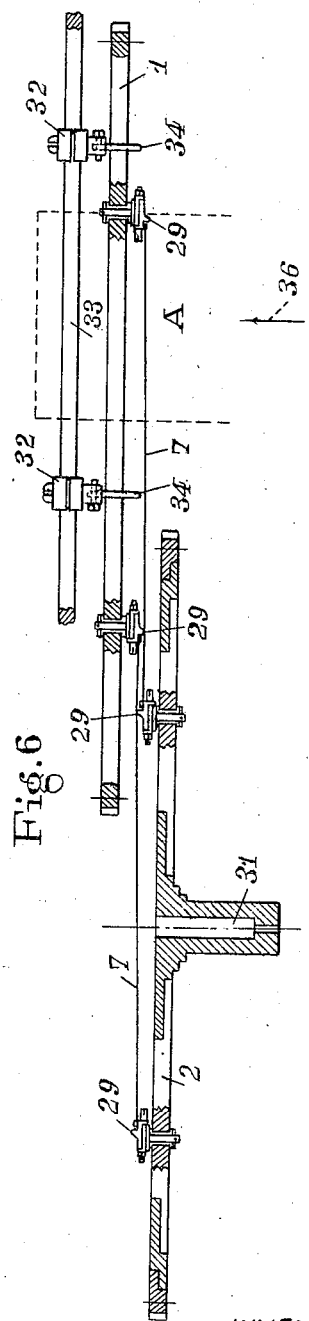

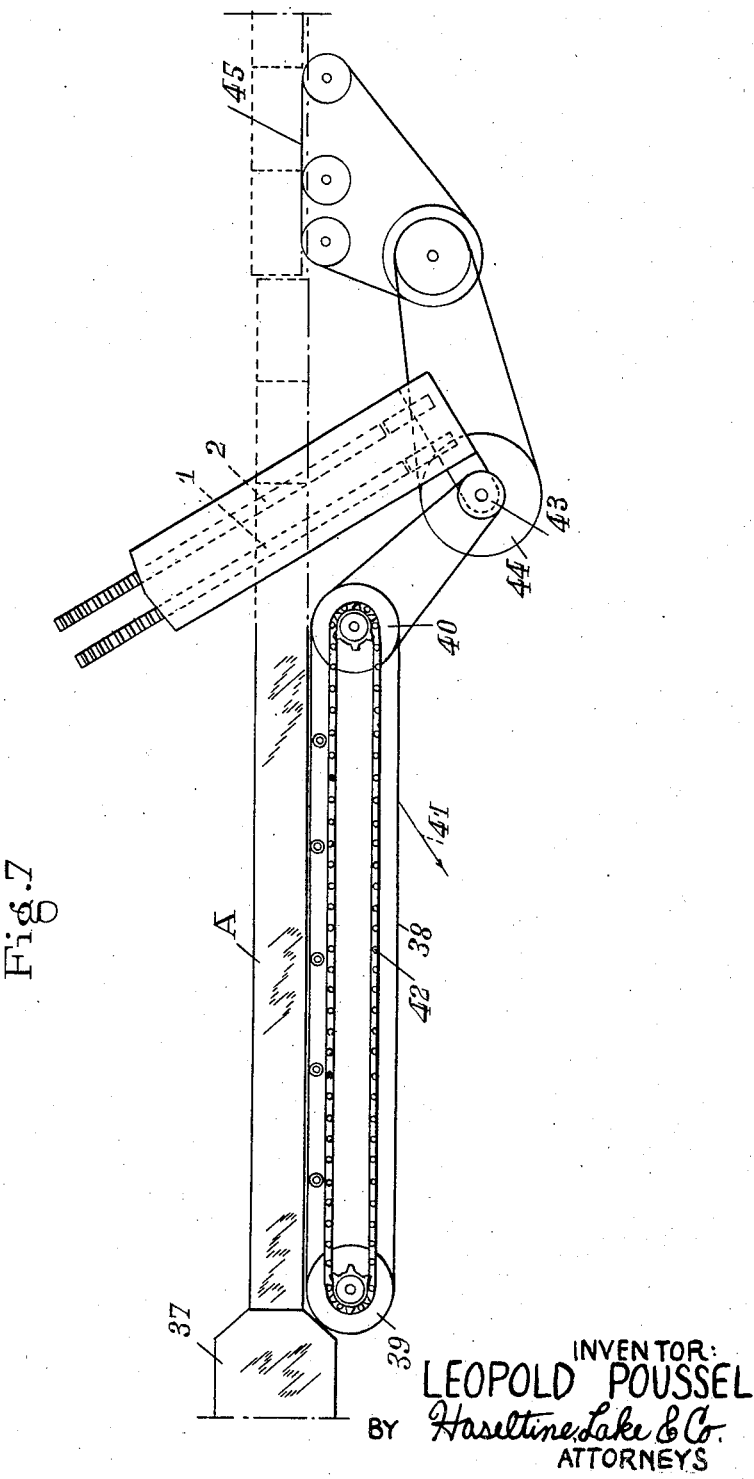

Patented Oct. 25, 1938

2,134,374

UNITED STATES PATENT OFFICE 2,134,374

AUTOMATIC CUTTING MACHINE FOR BRICKS OR THE LIKE

Léopold Poussel, St. Henri, Marseille, France, assignor to Etablissements Favant, St. Henri, Marseille, France Application August 31, 1937, Serial No. 161,761
In France September 4, 1936

4 Claims. (Cl. 25—110)

The object of the invention consists in improvements in the automatic cutting machines for solid or tubular bricks and all extruded products, described in French Patent No. 787.349 dated 8th March, 1935.

Experience has shown that although the results obtained with the above-mentioned automatic cutting machines were very much better than with the similar known machines, it was, however, advisable to make some improvements, in particular in the wire carriers, so as to obtain in a practical manner:

1. A momentarily greater tension of the cutting wires as they penetrate into the mass of clay forming the brick or other extruded product;

2. The definite avoidance of the cutting wires fouling each other at their point of intersection;

3. The guiding of the wires at the beginning of the cutting and, finally,

4. Modification of the mounting and the rotation device of one of the rings of the cutting machine to decrease the driving force and also the wear and also to ensure an even operation of the cutting machine of which the driving power is solely supplied by the feed of the strip of clay issuing from the extrusion plate.

Such are the exact objects of the present invention which is characterized:

1. By cutting wire carriers which have movable mountings producing a tension of the cutting wires which is always the same and which avoid, by their shape, said wires fouling each other;

2. By a chain connecting the two drums placed at each of the two ends of a conveyor belt driven by the strip of clay issuing from the extruding plate and also driving the cutter.

These improvements are shown in the accompanying drawings which are given by way of explanation and which can also serve as an example of construction of one of the embodiments of the object of the invention.

In said drawings:

Fig. 1, which is essentially diagrammatic, shows how the tension of the cutting wires is progressively and momentarily obtained at the instant when they become operative, said tension necessitating movable mountings;

Figs. 2 and 3 show respectively and on a large scale a view in longitudinal section of a movable wire carrier mounting, first in its slack position and then in its position of maximum tension;

Fig. 4 shows a front view of said wire carrier mounting in transverse section along the line IV—IV of Fig. 3;

Fig. 5 shows on a reduced scale a partial elevation of the whole arrangement of an automatic cutter provided with the improvements which justify the present application for patent;

Fig. 6 is a plan view of Fig. 5 with parts intentionally cut away to enable the novel members which characterize the invention to be seen;

Fig. 7, which is diagrammatic, shows a side view of the compensating device utilized for making the movement of the automatic cutter even.

Referring to Fig. 1, which reproduces diagrammatically the principle of the invention described in French Patent No. 787.349 dated 8th March, 1935, it will be observed that the axes line $1^a$ of the circle $1$ is larger than the line $2^a$ of the circle $2$, and that owing to this fact the wire $7$ will be progressively subjected to variations of length with likewise variable tension according to whether it passes on the right or on the left of the centre line BC. It will readily be seen in said figure that the wire $7$ is longer on the right than on the left; this variation is essentially obtained by the internal arrangement of the movable wire carrier mountings which form one of the features of the invention; said mountings enable the wire $7$ to have the maximum tension at the instant when it penetrates into the mass A of the clay which it has to cut, said tension esentially avoiding the deformations which said wire would have if it were not subjected to said tension.

When the cutting is completed the wire $7$ which returns towards the left will be subjected to a progressive slackening without, for that reason, becoming deformed and the same cycle will recur indefinitely so long as the cutter is actuated, but it will be observed (Fig. 5) that the circles $1$ and $2$ have the same diameter, only those of the axes lines which determine the fixing points of the movable mountings being different.

These variations of lengths which are essentially bound with the variations of tension of the wires are caused by the mountings shown in Figs. 2, 3 and 4.

Each of said mountings is formed by a trunnion $20$ freely rotating in a sleeve $21$ passing through the limbs $22$ (Figs. 5 and 6) of each of the rings $1$ and $2$. The trunnion $20$ is secured to a half-round part $23$ each of the sides $24$ and $25$ of which forms a right-angle having an orifice therein in which passes a rod 26 of different diameters and threaded, and which forms both an assembly part on which a second part 27, likewise rounded and having flanges 24ª and 24ᵇ can move, and a support for a retracting spring 28 lodged in the inner space formed by the juxtaposition of the part 27 on the part 23. The part 27 is provided with a boss 29 and a hook 30 on which is fixed one of the ends of the cutting wire 7.

The disc 2 (Fig. 5) rotates on a trunnion 31, whereas the ring I always rotates on rollers 14.

Two slides 32 mounted on the bar 33, each adjustably hold a rod 34 against the wires 7 when the latter are about to penetrate into the mass A of clay to be cut.

Said mass A of clay (Fig. 7) issues in a calibrated state from the extruding plate 37, and immediately comes into contact with an endless belt 38 forming a conveyor producing the minimum friction owing to its construction. The thrust exerted on the strip A to enable it to issue from the extruding plate 37 drives the belt 38 and thereby causes the drums 39 and 40 to rotate. The drum is fitted either with gears or with a belt for actuating the discs I and 2 of the cutter (Figs. 5 and 6); but experience has shown that the drive of the belt 38 which is effected solely by the thrust of the clay A determines an irregular rotation of the drum 40.

Such irregularity is caused by the fact that the drive of the cutter encounters different resistances. Thus at the instant when the cutting wires penetrate into the strip A of clay to cut same the resistance to driving of the disc I is greater than when the wire has come out of the strip A; at the instant of said resistance the belt 38 driving the drum 40 is also subjected to said resistance and as it is always pushed by the movement of the strip A of clay it is subjected to a compression effect which, without exactly producing slipping, causes however a loss of speed which is detrimental to the cutter. These phenomena would not take place if this same belt were subjected to a pulling effect exerted on the lower side, in the direction of the arrow 41, but this arrangement cannot be considered in practice.

These drawbacks are now eliminated by the addition of a simple chain 42 connecting the drum 39 to the drum 40. It will be understood that as soon as the mass or strip A of clay comes into contact with the drum 39 its rotation is immediately transmitted in a positive manner by the chain 42 to the drum 40.

Said chain acts in this case as a compensator avoiding the above-mentioned effects of compression of the belt 38. The drum 40 thus actuates through the instrumentality of gears, a chain or a belt, the driving wheel 43 of the discs I and 2 of the cutter and the disc 44 of the conveyor 45, with or without a separator of known system and operation, and the whole arrangement then operates in the normal and regular manner desired.

The operation of the wire carriers is as follows:

The rings I and 2 (Fig. 5), which always rotate at the same speed in the same direction (arrows 35), bring each of the cutting wires 7 above the mass A of clay which is driven in the direction of the arrow 36 (Fig. 6); the wire 7 (Fig. 5) which is about to penetrate into the clay to cut same operates under particular conditions: it is first of all stretched to its maximum according to the principle shown in Fig. 1 and then bears on each of the rods 34 (position of the wire shown in dotted lines) thereby avoiding any lateral flexing of said wire at the instant when it engages the mass A to be cut, thereby ensuring a clean and perfectly rectilinear cut.

The wire, continuing its downward movement, will not be long before it encounters in the same horizontal plane another wire 7 having a movement of translation in the opposite direction caused by the rotation of the disc 2, each of the opposite ends of said wires then passing above the bosses 29 (Fig. 6) of the wire carrier mountings and the fouling of the wires by intersection is thus definitely avoided.

By means of these improvements made in the mountings of the wires and by those made in the even drive of the cutter, a considerable progress is effected in this kind of apparatus which is justified by the novel results obtained, which are:

1. Decrease of the driving power of the cutter by reducing the friction of one of the rings which rotates on a shaft instead of rotating on rollers;
2. Better utilization of the cutting wires which always have a maximum tension obtained automatically at the instant of the cutting, thereby always effecting a frank and perfectly perpendicular cut;
3. Holding of the wire at the instant of cutting by means of the adjustable bearing fingers;
4. Elimination of the danger of the cutting wires fouling each other at the instant when they intersect;
5. Even drive of the wire carrier rings of the cutter in spite of the variations of resistance encountered.

However, these improvements could vary in their shapes and dimensions as well as in the nature of the metals used for their manufacture without, for that reason, changing the general arrangement of the invention which has just been described.

I claim:

1. A machine for cutting bricks and any extruded material, comprising in combination a conveyor belt to receive the extruded material as it issues from the extruding orifice and adapted to be driven by said material, a frame rigidly supported adjacent said conveyor belt, a shaft secured to said frame, a disc rotatably mounted on said shaft, an annulus arranged substantially parallel with said disc and having its centre longitudinally spaced from the centre of said disc, a plurality of rollers mounted on said frame and adapted to bear on the inner periphery of said annulus so that it is rotatable thereon, said conveyor belt passing through said annulus, a plurality of cutting wires extending between said disc and said annulus, means for connecting the ends of said cutting wires to said disc and said annulus, the points of connection of said wires being spaced along the circumferences of circles concentric with the circumferences of said disc and said annulus respectively, and means for rotating said disc and said annulus in the same direction by said conveyor, said disc, annulus and means for connecting the wires thereto serving as means for progressively and automatically varying the tension of each of said wires in such a manner that said tension is at its maximum as the wire penetrates into said material.

2. A machine for cutting bricks and any extruded material, comprising in combination a pair of spindles spaced apart below the extruded material, a drum and a sprocket wheel secured to said drum rotatably mounted on each of said spindles, an endless belt mounted on said drums to receive said material as it issues from the extruding orifice and adapted to be driven by said material, an endless chain mounted on said sprocket wheels, a frame rigidly supported adpacent said conveyor belt, a shaft secured to said frame, a disc rotatably mounted on said shaft, an annulus arranged substantially parallel with said disc and having its centre longitudinally spaced from the centre of said disc, a plurality of rollers mounted on said frame and adapted to bear on the inner periphery of said annulus so that it is rotatable thereon, said conveyor belt passing through said annulus, a plurality of cutting wires extending between said disc and said annulus, means for connecting the ends of said wires to said disc and said annulus, the points of connection of the wires being spaced along the circumferences of circles concentric with the circumferences of said disc and said annulus respectively, and means for rotating said disc and said annulus in the same direction by said conveyor, said disc, annulus and means for connecting the wires thereto serving as means for progressively and automatically varying the tension of each of said wires in such a manner that said tension is at its maximum as the wire penetrates into said material.

3. A machine for cutting bricks and any extruded material, comprising in combination a conveyor belt to receive the extruded material as it issues from the extruding orifice and adapted to be driven by said material, a frame rigidly supported adjacent said conveyor belt, a shaft secured to said frame, a disc rotatably mounted on said shaft, an annulus arranged substantially parallel with said disc and having its centre longitudinally spaced from the centre of said disc, a plurality of rollers mounted on said frame and adapted to bear on the inner periphery of said annulus so that it is rotatable thereon, said conveyor belt passing through said annulus, means for rotating said disc and said annulus in the same direction by said conveyor, said disc and said annulus having a plurality of holes spaced along the circumference of circles concentric with the circumferences of said disc and said annulus respectively and of different diameter on the disc and on the annulus, a bushing fixed in each of said holes, a trunnion mounted in said bushing, a U-shaped member secured to one end of said trunnion and having a hole in each lateral end, a second U-shaped member having a hole in each lateral end and invertedly positioned in the first U-shaped member so that the holes of said two members register, a rod passing through said holes, means for rigidly securing said rod to said first U-shaped member, said second U-shaped member being adapted to slide on said rod, resilient means interposed between one of the lateral ends of each U-shaped member to urge said ends towards each other, a boss on the top side of said second member, a hook on said second member, a plurality of cutting wires extending between said disc and said annulus and having their respective ends attached to the corresponding hooks of said second members on the disc and the annulus, and means for preventing the lateral flexing of said wires when they penetrate into said material.

4. A machine for cutting bricks and any extruded material, comprising in combination a conveyor belt to receive the extruded material as it issues from the extruding orifice and adapted to be driven by said material, a frame rigidly suported adjacent said conveyor belt, a shaft secured to said frame, a disc rotatably mounted on said shaft, an annulus arranged substantially parallel with said disc and having its centre longitudinally spaced from the centre of said disc, a plurality of rollers mounted on said frame and adapted to bear on the inner periphery of said annulus so that it is rotatable thereon, said conveyor belt passing through said annulus, means for rotating said disc and said annulus in the same direction by said conveyor, said disc and said annulus having a plurality of holes spaced around the circumference of circles concentric with the circumference of said disc and said annulus respectively, and of different diameter on the disc and on the annulus, a bushing fixed in each of said holes, a trunnion mounted in said bushing, a U-shaped member secured to one end of said trunnion and having a hole in each lateral end, a second U-shaped member having a hole on each lateral end and invertedly positioned in the first U-shaped member so that the holes of said two members register, a rod passing through said holes, means for rigidly securing said rod to said first U-shaped member, said second U-shaped member being adapted to slide on said rod, resilient means interposed between one of the lateral ends of each of said U-shaped members to urge said ends towards each other, a boss on the top side of said second member, a hook on said second member, a plurality of cutting wires extending between said disc and said annulus and having their respective ends attached to the corresponding hooks on said disc and said annulus, a bar secured to said frame, a plurality of members slidably mounted on said bar, and a finger resiliently mounted on each of said members and located so that said fingers bear on said wires when the latter are about to penetrate into said material.

LÉOPOLD POUSSEL.